(12) United States Patent
Czernysz et al.

(10) Patent No.: US 6,469,262 B1
(45) Date of Patent: Oct. 22, 2002

(54) DYNAMIC WEIGHING MODULE PROVIDED WITH A DEVICE FOR HOLDING AND GUIDING MAILPIECES

(75) Inventors: Christian Czernysz, Goussainville (FR); Xavier Deshayes, Croissy (FR); Thierry Le Jaoudour, Verrieres Le Buisson (FR)

(73) Assignee: Neopost Industrie, Bagneux (FR)

( * ) Notice: Subject to any disclaimer, the term of this patent is extended or adjusted under 35 U.S.C. 154(b) by 65 days.

(21) Appl. No.: 09/691,256

(22) Filed: Oct. 19, 2000

(30) Foreign Application Priority Data

Oct. 25, 1999 (FR) ............................................ 9913261

(51) Int. Cl.[7] ........................ G01G 19/40; G01G 23/00; G01G 21/22; B65H 5/00
(52) U.S. Cl. .................... 177/25.15; 177/145; 177/161; 177/262; 271/2
(58) Field of Search .......................... 177/25.15, 119, 177/145, 161, 253, 262; 271/2

(56) References Cited

U.S. PATENT DOCUMENTS

| 4,778,018 A | 10/1988 | Cordery et al. | 177/210 FP |
|---|---|---|---|
| 4,836,311 A * | 6/1989 | Hubbard | 177/145 |
| 4,836,313 A | 6/1989 | Hubbard | 177/210 FP |
| 4,842,084 A * | 6/1989 | Pirc | 177/145 |
| 4,844,188 A * | 7/1989 | Pirc et al. | 177/145 |
| 4,848,492 A * | 7/1989 | Hubbard et al. | 177/145 |
| 4,856,604 A | 8/1989 | Sisson et al. | 177/210 FP |
| 4,865,139 A * | 9/1989 | Cohen et al. | 177/145 |
| 4,901,808 A * | 2/1990 | Wu | 177/145 |
| 4,903,788 A * | 2/1990 | Cordery et al. | 177/145 |
| 4,923,023 A * | 5/1990 | Dolan et al. | 177/25.15 |
| 4,956,782 A * | 9/1990 | Freeman et al. | 177/25.15 |
| 5,723,825 A | 3/1998 | Dolan et al. | 177/145 |
| 5,726,393 A | 3/1998 | Lyga | 177/25.15 |

* cited by examiner

Primary Examiner—Randy W. Gibson
(74) Attorney, Agent, or Firm—Sughrue Mion, PLLC

(57) ABSTRACT

A dynamic weighing module including a weighing platform, a vertical, longitudinal registration wall, drive belts for transporting the mailpieces from a position upstream of this platform towards a downstream position, and a support fast with the dynamic weighing module on which is mounted at least one bearing element intended to hold the mailpieces on the weighing platform during transport thereof from the upstream position towards the downstream position. The support element is inclined towards the registration wall by a determined angle α so as to guide the mailpieces against the longitudinal registration wall.

10 Claims, 3 Drawing Sheets

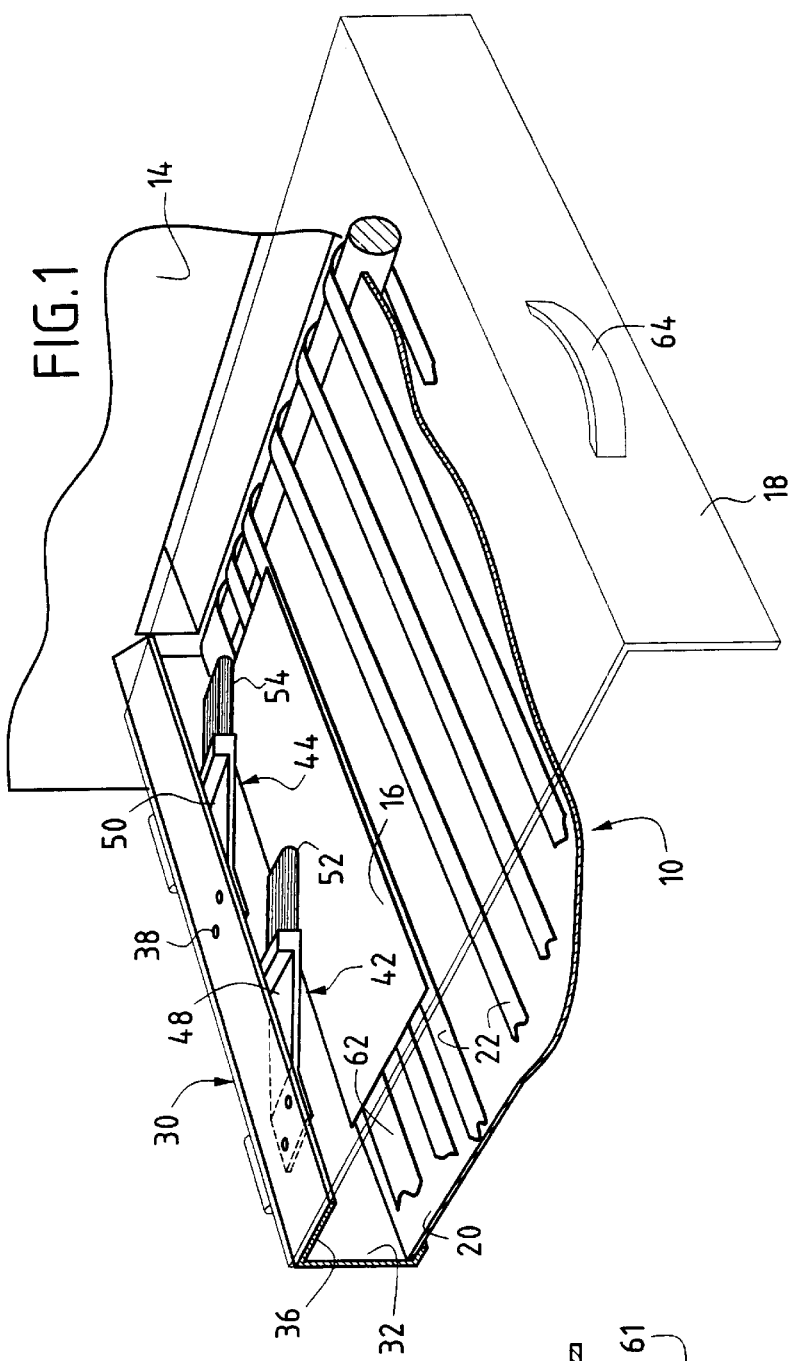
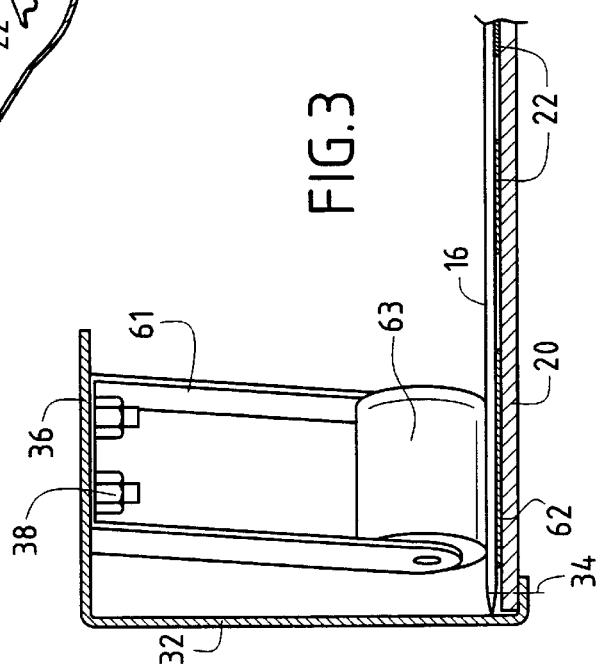

DYNAMIC WEIGHING MODULE PROVIDED WITH A DEVICE FOR HOLDING AND GUIDING MAILPIECES

FIELD OF THE INVENTION

The present invention relates to the specific field of mail processing, and in particular to a dynamic weighing module interposed between a feeder/extractor and a machine for franking mailpieces and provided with a device for guiding these pieces and holding them in position.

BACKGROUND OF THE INVENTION

Dynamic weighing modules intended to be employed with franking machines are well known. French Application No. 2 388 362 (POSTALIA) illustrates a particular example thereof. Such devices are formed by a weighing platform and drive belts for automatically transporting the mailpieces from one edge of this platform to the other. The weighing module can be used alone, but it is usually inserted in a mail processing assembly between the inlet of the franking module and the outlet of the feeder/extraction module from which the closed envelopes having to be franked are ejected.

In these mail processing assemblies, the transport of the mailpieces during the so-called dynamic weighing step, is particularly important for correct franking. In effect, faulty positioning on the weighing platform may lead, on the one hand, to phenomena of jamming at the inlet of the franking module and, on the other hand, to defective printing of the indicia which are in that case no longer printed perfectly horizontally (a horizontal line will for example be represented in a wavy form).

Now, the consequences of such defective printing are particularly important insofar as, the indicia being a monetary value, the envelope risks being rejected by the Postal Administration.

In order to limit these shortcomings, U.S. Pat. No. 4,856,604 provided holding the mailpieces firmly on the weighing platform by means of presser rollers. Unfortunately, this solution does not suffice in order to avoid all the improper positionings of the mailpieces. Applicants have thus sought to identify the principal causes of such improper positionings in order to find an overall solution to these problems. Unfortunately these causes are multiple and depend on how the envelopes are both filled and closed. In effect, filling of the envelopes by hand is often irregular, for example without the documents being inserted completely to the bottom of the envelope. They are also insufficiently crushed. This results in an imprecise closure of the flaps which disturbs longitudinal wedging along the feed path. These flaps, like the contents of the envelope, may also be bent, as a result of prior preparation of the mail in a bundle by means of an elastic band, which, for thick envelopes, may lead to jamming at the inlet of the franking module. Finally, it is rare for the charge of the mailpieces in the feeder/extraction module to be optimal, i.e. with efficient wedging along the feed path.

It is an object of the present invention to solve these problems simply and economically by providing the weighing module with a holding and guiding device guaranteeing a perfect introduction of the mailpieces in the franking machine. One object of the invention is thus to ensure a precise transfer of the envelopes from the extractor towards the franking machine. Another object is to ensure that the envelopes are held flat.

SUMMARY OF THE INVENTION

These objects are achieved by a dynamic weighing module comprising a weighing platform, a vertical, longitudinal registration wall, drive belts for transporting the mailpieces from a position upstream of this platform towards a downstream position, and support means fast with the dynamic weighing module and on which is mounted at least one bearing element intended to hold the mailpieces on the weighing platform during transport thereof from said upstream position towards said downstream position, characterized in that said support element is inclined towards said registration wall by a determined angle α so as to guide these mailpieces against said vertical longitudinal registration wall. This determined angle is included between some degrees and 35°, and preferably equal to about 25°.

In this way, the mailpieces are transported on the weighing platform with perfect lateral wedging, guaranteeing subsequent printing which is particularly precise.

These support means are preferably constituted by the vertical longitudinal registration wall. They may also be constituted by a plate in the form of a ⌈ with a vertical longitudinal wall forming the vertical longitudinal registration wall and a horizontal longitudinal wall forming support for said bearing elements.

According to a first embodiment, the bearing element comprises an elastic holding arm, at the end of which a supple brush is fixed.

According to a second embodiment, this bearing element comprises an elastic holding arm, at the end of which is fixed a supple pressure roller, for example made of foam.

According to a third embodiment, this bearing element comprises an elastic holding arm, at the end of which is fixed a supple pad formed by one or more juxtaposed elementary pads.

In an advantageous variant embodiment, the support means further comprise a cover forming articulated lid for the dynamic weighing module. This lid may constitute a static weighing platform.

The dynamic weighing module may advantageously comprise at the level of said bearing element a drive belt, of which the width is at least equal to that of the brush or the pressure roller.

BRIEF DESCRIPTION OF THE DRAWINGS

The invention will be more readily understood on reading the following description given by way of indicative and non-limiting example, with reference to the accompanying drawings, in which:

FIG. 1 shows a view in perspective of a weighing module provided with a guiding and holding device according to the invention.

FIG. 3 shows a view in section of a variant of the guiding and holding device of FIG. 1.

DESCRIPTION OF PREFERRED EMBODIMENT

Figure 2:
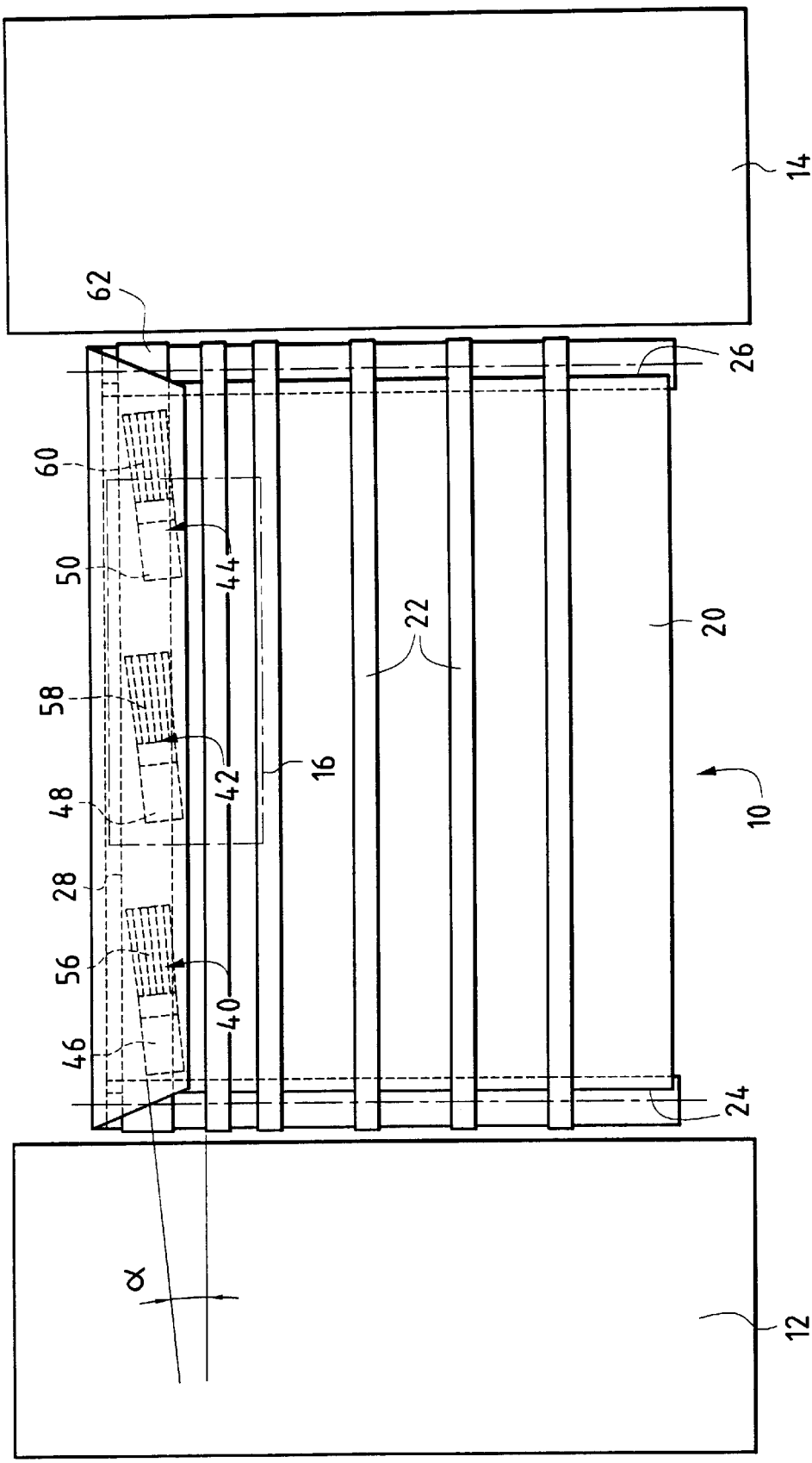
FIG. 2 is a plan view, with the lid removed, of the weighing module of FIG. 1.

Referring now to the drawings, and firstly to FIGS. 1 and 2, an autonomous, motorized, dynamic weighing module 10 is located between a feeder/extraction module 12 and a module 14 for franking mailpieces 16. This weighing module 10 comprises a weighing platform 20 and a plurality of drive belts 22 intended for transporting the mailpieces from a position upstream of this platform, at the level of an upstream transverse face 24 of the weighing module, towards a downstream position, at the level of a downstream transverse face 26 of this module.

According to the invention, this weighing module comprises a device for holding and guiding the mailpieces on the weighing platform 20 formed by support means 30 constituted by a plate of metal, advantageously in the form of an inverted "L" with a vertical longitudinal wall 32 fast with the weighing platform, advantageously via screws 34, at the level of a longitudinal rear face 28 of the dynamic weighing module, and an upper horizontal wall 36 fixedly supporting (for example via screws 38), at least one bearing element 40, 42, 44 intended, when the mailpieces are transported from the upstream position 24 towards the downstream position 26, to hold and guide these mailpieces on the weighing platform 20 and against the longitudinal vertical wall 32 of the plate in that case forming a registration wall.

The support means advantageously comprise three bearing elements, disposed one behind the other in the direction of advance of the mailpieces, and each formed by an elastic holding arm 46, 48, 50 inclined towards downstream in this direction of transport and to the lower end of which is fixed a supple brush 52, 54 whose length is relatively long in order to exert a weak but sufficient effort of pressure on the mailpiece 16 to hold it applied on the drive belts 22, without braking or wearing them (cf. FIG. 1).

This brush may be replaced by a supple pad 56, 58, 60 made of foam, or a plurality of similar elementary pads, juxtaposed, as illustrated in FIG. 2.

According to an alternate embodiment illustrated in FIG. 3, this bearing element may also comprise an elastic holding arm 61 likewise inclined towards downstream in this direction of transport and at the lower end of which is fixed a supple pressure roller 63, for example made of foam.

Figure 4:
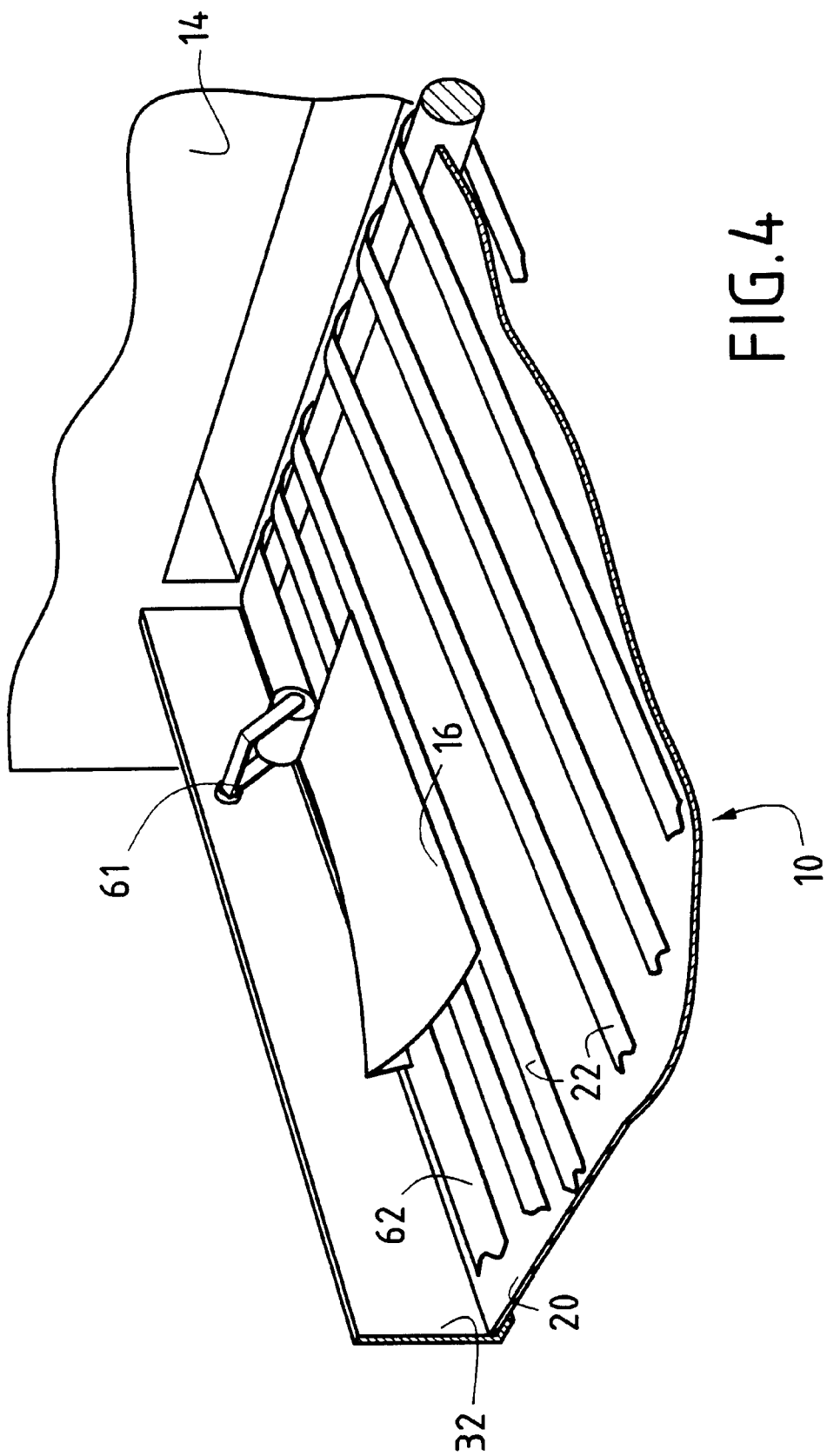
FIG. 4 is a variant embodiment of the guiding and holding device.

When the support means 30 comprise one sole bearing element, as illustrated in FIG. 4, the latter is preferably positioned at the outlet of the dynamic weighing module 10 in order to create a "tunnel effect" capable of reclosing a poorly closed, filled envelope 16 without urging it at the inlet of the dynamic weighing module. In effect, it may happen that an envelope opens when sliding over the drive belts after acceleration and ejection by the extractor 12 which is often located slightly higher than the weighing module 10. In this embodiment, the single bearing element may advantageously be fixed directly to the longitudinal vertical registration wall 32.

Whatever the form of embodiment envisaged, these brushes, pads or supple rollers are inclined towards the longitudinal registration wall 32 by a determined angle cc with respect to the direction of transport of the mailpieces, so as to ensure guiding by aligning or lateral wedging of these pieces against this registration wall for the whole time that they traverse the weighing module. The value of this angle, included between 0° and 35°, depends in particular on the width of the weighing module and the number of bearing elements used and on the width of the brush. For a weighing module about 30 cm wide, on which three bearing elements each equipped with a brush 3 cm wide, this angle is about 25°. If the number of bearing elements is less, i.e. two or even one element, this angle may be reduced to about 10° or even less. In the event of the bearing elements being more numerous, four or even five in number, this angle may attain 35°.

One drive belt 62 preferably presents a width greater than that of the other belts, and at least equal to that of the brush or supple pressure roller, in order to optimize guiding and lateral wedging of the mailpieces and to prevent a mailpiece from sliding by resting directly on the weighing platform.

In order to limit jamming of thick mailpieces at the inlet of the franking module 14 resulting from the deformation of these pieces, it is provided to cover the weighing module 10 with a lid 18, articulated on the support means 30 at the level of its horizontal upper wall 36 and whose free end rests on a raised edge (not shown) fast with the weighing platform. This lid performing the role of an upper stop makes it possible to straighten up the mailpieces of large thickness (of the order of the maximum thickness admissible by the franking module, viz. about 16 mm) which would have been deformed due to their being placed in a bundle. In addition, this lid, which is entirely fast with the weighing platform, may constitute per se a static weighing platform that may be used in manual weighing mode, in particular for voluminous packets, which are in that case directly placed on this lid (prior calibration taking into account the weight of this lid is, of course, necessary). This avoids such packets damaging the drive belts or resting inclined on the horizontal wall of the support means.

The lid is advantageously made of a translucent material such as Plexiglas®. Thanks to the articulation on the support means fast with the weighing module, this lid can be raised via a handle 64 for automatically weighing in portrait mode, i.e. for mailpieces disposed transversely to the direction of advance.

What is claimed is:

1. Dynamic weighing module comprising a weighing platform, a vertical, longitudinal registration wall, drive belts for transporting the mailpieces from a position upstream of this platform towards a downstream position, and support means fast with the dynamic weighing module and on which is mounted at least one bearing element 40 intended to hold the mailpieces on the weighing platform during transport thereof from said upstream position towards said downstream position, wherein said bearing element is inclined towards said registration wall by a determined angle $\alpha$ so as to guide these mailpieces against said vertical longitudinal registration wall.

2. The dynamic weighing module of claim 1, wherein said determined angle is included between some degrees and 35°, and preferably equal to about 25°.

3. The dynamic weighing module of claim 1, wherein said support means are constituted by said vertical longitudinal registration wall.

4. The dynamic weighing module of claim 3, wherein said support means includes a vertical wall forming said vertical longitudinal registration wall and a horizontal longitudinal wall forming support for said bearing elements.

5. The dynamic weighing module of claim 1, wherein said bearing element comprises an elastic holding arm at the lower end of which is fixed a supple brush.

6. The dynamic weighing module of claim 1, wherein said bearing element comprises an elastic holding arm, at the lower end of which is fixed a supple pressure roller, for example made of foam.

7. The dynamic weighing module of claim 1, wherein said bearing element comprises an elastic holding arm, at the lower end of which is fixed a supple pad formed by one or more juxtaposed elementary pads.

8. The dynamic weighing module of claim 1, wherein said support means further comprise a cover forming articulated lid for the dynamic weighing module.

9. The dynamic weighing module of claim 8, wherein said lid also constitutes a static weighing platform.

10. The dynamic weighing module of claim 1, further comprising a drive belt having a width that is at least equal to a width of the brush, pad or pressure roller.

* * * * *